US00RE43849E

(19) United States
(12) Reissued Patent
Kitano et al.

(10) Patent Number: US RE43,849 E
(45) Date of Reissued Patent: *Dec. 11, 2012

(54) INFORMATION RETRIEVAL APPARATUS AND METHOD

(75) Inventors: Hiroaki Kitano, Saitama (JP); Junichi Rekimoto, Kanagawa (JP)

(73) Assignee: Sony Corporation, Tokyo (JP)

( * ) Notice: This patent is subject to a terminal disclaimer.

(21) Appl. No.: 12/875,488

(22) Filed: Sep. 3, 2010

Related U.S. Patent Documents

Reissue of:
(64) Patent No.: 5,926,116
Issued: Jul. 20, 1999
Appl. No.: 08/770,040
Filed: Dec. 19, 1996

U.S. Applications:
(63) Continuation of application No. 12/711,349, filed on Feb. 24, 2010, which is a continuation of application No. 09/910,288, filed on Jul. 20, 2001, now Pat. No. Re. 41,174.

(30) Foreign Application Priority Data

Dec. 22, 1995 (JP) ..... 07-334445

(51) Int. Cl.
*H04L 12/16* (2006.01)
*G06F 17/30* (2006.01)
*G06K 9/54* (2006.01)

(52) U.S. Cl. ..... 340/988; 707/999.001; 707/999.003; 709/217; 709/219; 340/990; 340/995.22; 340/991; 340/992; 340/994; 358/453; 701/532; 701/533; 379/90.01; 382/282; 382/305

(58) Field of Classification Search ..... 340/990–994, 340/998, 995.22, 996; 707/6, 106, 3, 5, 10, 707/104, 114; 701/207–208; 379/90.01; 704/217–219, 246; 705/14, 23, 84; 358/103, 358/440; 370/389, 392
See application file for complete search history.

(56) References Cited

U.S. PATENT DOCUMENTS 5,155,774 A * 10/1992 Numagami ..... 382/113
(Continued)

FOREIGN PATENT DOCUMENTS

JP 04-070729 3/1992
(Continued)

OTHER PUBLICATIONS

Office Action from Japanese Patent Office in corresponding Application No. 2005-205775 dated Oct. 9, 2008 (2 pages).

(Continued)

*Primary Examiner* — Steven H Nguyen
(74) *Attorney, Agent, or Firm* — Finnegan, Henderson, Farabow, Garrett & Dunner, L.L.P.

(57) ABSTRACT

The invention provides an information retrieval apparatus and an information retrieval method by which information can be retrieved in an improved operability. A CPU controls a video camera to fetch an image and controls a GPS to detect a current position. The CPU reads out, from within image data stored in a corresponding relationship with URLs of WWW servers, those image data which correspond to position data regarding positions around the detected current position from a WWW data base via a modem and a host machine. Then, the CPU selects, from among the read out image data, that image data which matches with the fetched data, reads out a URL corresponding to the image data and accesses a WWW server designated by the URL.

7 Claims, 7 Drawing Sheets

U.S. PATENT DOCUMENTS

| | | | | |
|---|---|---|---|---|
| 5,220,508 | A | 6/1993 | Ninomiya et al. | |
| 5,335,072 | A | 8/1994 | Tanaka et al. | |
| 5,543,789 | A | 8/1996 | Behr et al. | |
| 5,644,765 | A | 7/1997 | Shimura et al. | |
| 5,657,389 | A * | 8/1997 | Houvener | 713/186 |
| 5,682,525 | A | 10/1997 | Bouve et al. | |
| 5,745,360 | A | 4/1998 | Leone et al. | |
| 5,751,228 | A | 5/1998 | Kamiya et al. | |
| 5,799,082 | A | 8/1998 | Murphy et al. | |
| 5,978,773 | A * | 11/1999 | Hudetz et al. | 705/23 |
| 6,415,291 | B2 | 7/2002 | Bouve et al. | |
| RE41,174 | E * | 3/2010 | Kitano et al. | 340/988 |
| 2001/0021930 | A1 * | 9/2001 | Bouve et al. | 707/7 |
| 2004/0036649 | A1 | 2/2004 | Taylor | |
| 2004/0090952 | A1 * | 5/2004 | Kubler et al. | 370/352 |

FOREIGN PATENT DOCUMENTS

| | | |
|---|---|---|
| JP | 05-207408 | 8/1993 |
| JP | 06-168277 | 6/1994 |
| JP | 07-301540 | 11/1995 |

OTHER PUBLICATIONS

Hiroki Takaha et al., *The Open Image Retrieval System, Girls on the World Wide Web*, Institute of Industrial Science, University of Tokyo (9 pages).

Decision of Refusal issued in counterpart Japanese Patent Application No. 2005-208775 on Oct. 9, 2008 (3 pages) with English language translation thereof (2 pages).

* cited by examiner

INFORMATION RETRIEVAL APPARATUS AND METHOD

Matter enclosed in heavy brackets [ ] appears in the original patent but forms no part of this reissue specification; matter printed in italics indicates the additions made by reissue.

*This is a continuation of application Ser. No. 12/711,349, filed Feb. 24, 2010, which is a continuation of Reissue application Ser. No. 09/910,288 filed Jul. 20, 2001 (now Re. 41,174), which is a Reissue of U.S. Pat. No. 5,926,116, issued Jul. 20, 1999. All of these applications are incorporated herein by reference in their entireties. This application also claims the benefit of priority under 35 U.S.C. §119 to Japanese Patent Application No. 07-334445, filed in the Japanese Patent Office on Dec. 22, 1995, which also is incorporated herein by reference in its entirety.*

BACKGROUND OF THE INVENTION

This invention relates to an information retrieval apparatus and method, and more particularly to an information retrieval apparatus and method wherein an image is fetched and a current position is detected and then, based on the position detected, image data which conforms with the fetched image is selected from among image data selectively stored in advance and a URL or the like corresponding to the selected image data is retrieved.

In the Internet which is a world-wide computer network, a WWW (World Wide Web) which provides various information has been established.

Here, for an information providing system available on the Internet, WWW developed by CERN (European Center for Nuclear Search) in Switzerland is known. This technology allows a user to browse information including text, image and voice for example in the hyper text form. Based on HTTP (Hyper Text Transfer Protocol), the information stored in a WWW server terminal is sent asynchronously to terminals such as personal computers.

The WWW server is constituted by server software called HTTP demon and HTML file in which hyper text information is stored. The hyper text information is described in a description language called HTML (Hyper Text Makeup Language). In the description of a hyper text by HTML, a logical structure of a document is expressed in a format specification called tag enclosed by "<" and ">". Description of linking to other information is made based in link information called anchor. A method in which a location at which required information is stored by the anchor is URL (Uniform Resource Locator).

A protocol for transferring a file described in HTML on the TCP/IP network is HTTP. This protocol has a capability of transferring a request for information from a client to the WWW server and the requested hyper text information stored in the HTML file to the client.

Used by many as an environment for using WWW is client software such as Netscape Navigator (trademark) called WWW browser.

Using the WWW browser, a file on a WWW server on the Internet which spreads in a world-wide scale corresponding to a URL, a so-called home page, can be automatically downloaded, and as is called netsurfing, a network service wherein home pages which are linked to each other are successively traced to observe various information sources of WWW can be enjoyed.

It should be noted that demon denotes a program for executing control and processing in the background when performing a job in the UNIX environment.

FIG. 8 illustrates a manner in which a terminal equipment such as a WWW server is connected to the Internet.

Referring to FIG. 8, the WWW includes a large number of WWW servers 51 connected to the Internet. The WWW servers 51 provide home pages of the hyper text form and so forth to other terminal equipments connected to the Internet in response to accesses from them.

In order to access such a WWW server 51 as described above, such a procedure is taken that a terminal equipment such as a work station 52 connected to the Internet is manually operated to access the WWW server 51 or a popular personal computer 53 to which a modem is connected is used to log in, via a telephone line, to a predetermined host machine (access provider) 54 connected to the Internet and then access the WWW server 51 from the host machine 54.

Accordingly, accessing to a WWW server 51 is normally performed indoors such as in an office in which such work station 52 is provided or in a house of an individual who owns such personal computer 53.

Accordingly, for example, when it is intended to acquire, during shopping in a town, information of a certain shop in the town from a home page of the WWW, it is a possible procedure, for example, to connect a portable telephone set 56 to a portable personal computer 55 provided with a modem, log in to the host machine 54 and access a WWW server 51.

In such an instance, however, a URL (Uniform Resource Locator) of the home page which provides information of the shop must be remembered in advance. Further, where a portable telephone set is connected to and used with a portable personal computer with a modem, the overall system becomes bulky. Further, since a URL must be inputted using a keyboard, the operability is low when the system is used outdoors such as in a town.

SUMMARY OF THE INVENTION

It is an object of the present invention to provide an information retrieval apparatus of a comparatively small size which does not require use of a keyboard and is high in operability.

It is another object of the present invention to provide an information retrieval method which does not require use of a keyboard and allows a good operability of an information retrieval apparatus.

In order to attain the objects described above, according to the present invention, image data are stored in advance in predetermined storage locations corresponding to information to be provided, and an image fetched by a user is compared with the image data stored in advance and information corresponding to the image data conforming to the image is read out.

In particular, according to an aspect of the present invention, there is provided an information retrieval apparatus for retrieving information from a data base which has registration data including position data, image data and designation information such as a URL for specification of individual information in a mutually corresponding relationship, comprising fetching means for fetching an image, position detection means for detecting a current position of the information retrieval apparatus, and selection means for selecting, from within the image data having the position data regarding positions around the current position detected by the position detection means, that of the designation information having image data which matches with the image fetched by the fetching means.

In the information retrieval apparatus, the fetching means fetches an image, and the position detection means detects a current position of the information retrieval apparatus. Then, the selection means selects, from within the image data having the position data regarding positions around the current position detected by the position detection means, that of the designation information having image data which matches with the image fetched by the fetching means.

According to another aspect of the present invention, there is provided an information retrieval method for retrieving information from a data base which has registration data including position data, image data and designation information for specification of individual information in a mutually corresponding relationship, comprising the steps of fetching an image, detecting a current position, and selecting, from within the image data having the position data regarding positions around the detected current position, that image data which matches with the fetched image.

In the information retrieval method, an image is fetched and a current position is detected. Then, from with in the image data having the position data regarding positions around the detected current position, that image data which matches with the fetched image is selected.

With the information retrieval apparatus and the information retrieval method, image data is read out from the data base based on a position when an image is fetched by a user, and information such as a URL corresponding to image data matching with the image fetched by the user is read out from the data base. Consequently, the necessity for use of a keyboard is eliminated. Further, since no keyboard need be provided, the apparatus can be formed in a reduced size and have an improved operability.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
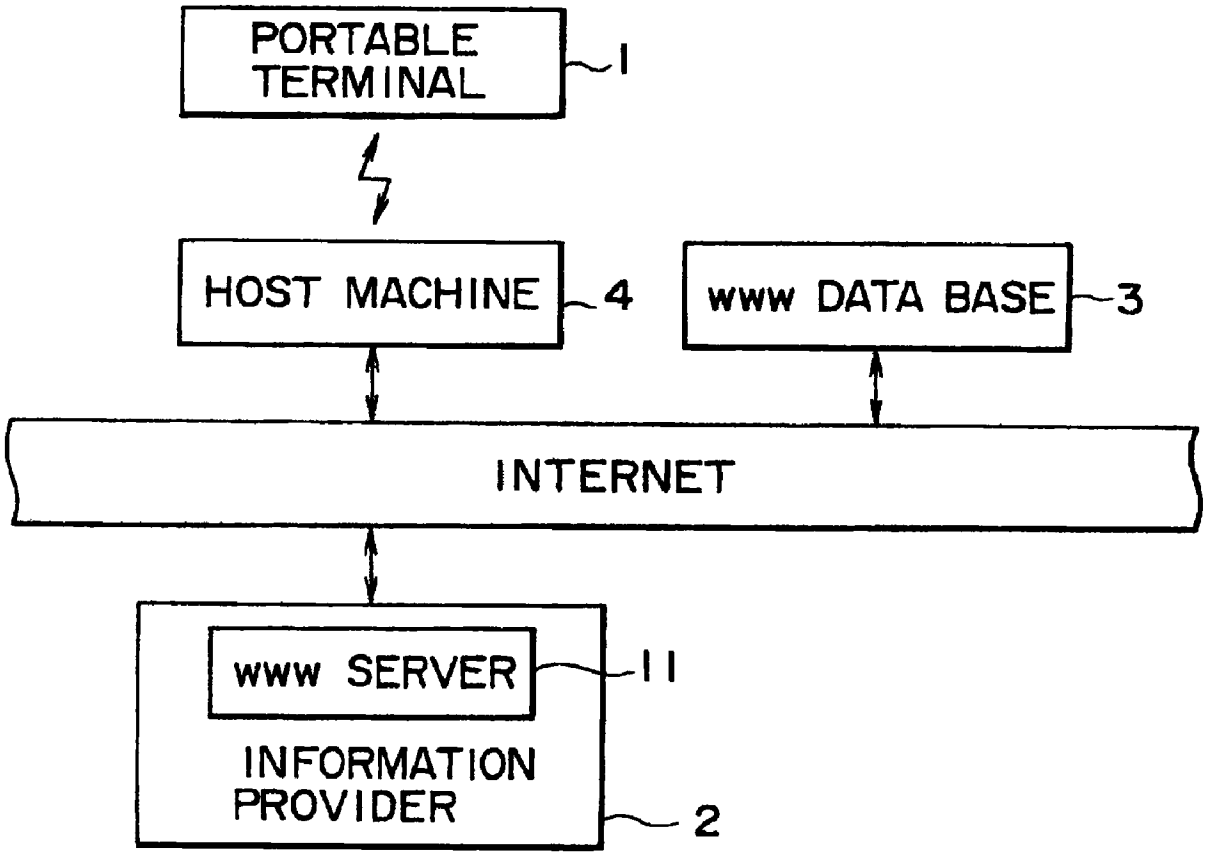
FIG. 1 is a block diagram showing a construction of an information retrieval system which employs a portable terminal to which an information retrieval apparatus of the present invention is applied.

Referring first to FIG. 1, there is shown an example of an information retrieval system which makes use of an information retrieval apparatus of the present invention.

In the information retrieval system, an information provider 2 can make a WWW server 11 thereof hold information provided from the same and register a file or a home page (HTML file) stored in the WWW server 11 into a WWW data base 3 via the Internet.

Figure 2:
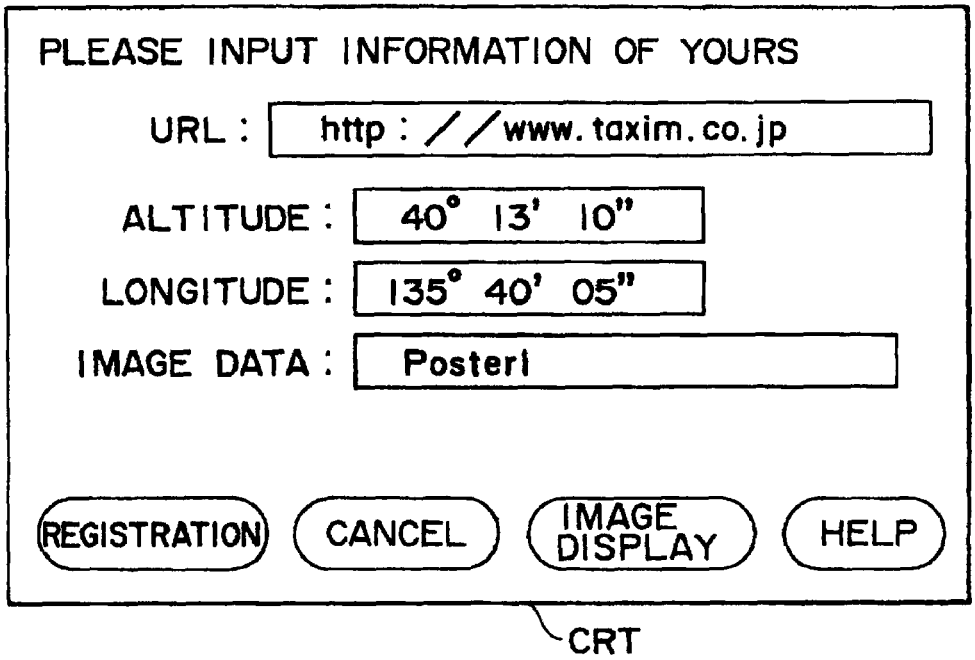
FIG. 2 is a schematic illustration showing an image of a display screen upon registration of a URL by an information provider shown in FIG. 1.

When a URL of a home page in the WWW server 11 is registered into the WWW data base 3, for example, columns or sections into which a URL, position data (latitude and longitude) and image data are displayed as seen in FIG. 2.

In the example of display shown in FIG. 2, "http://www.taxim.co.jp" is entered as the URL; "40_/ 13' 10"" is entered as the latitude (position data); "135_/ 40' 05"" is entered as the longitude (position data); and "Poster1" is entered as the name (file name) of image data.

Figure 3:
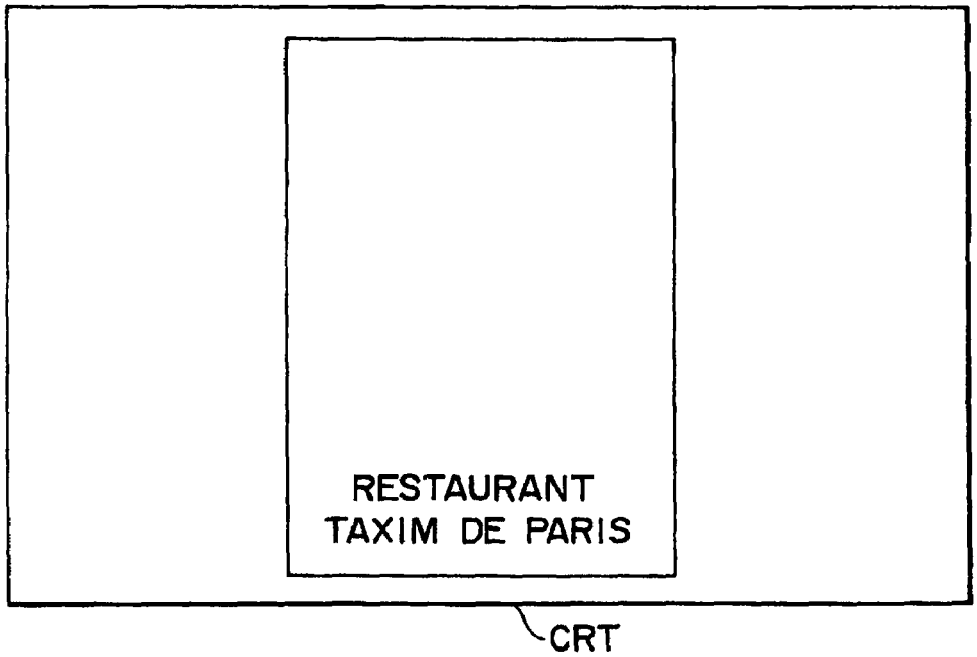
FIG. 3 is a schematic illustration showing an example of a display screen of image data registered in a corresponding relationship to a URL.

Then, if a mouse or the like is manually operated to click a registration button at a lower portion of the screen shown in FIG. 2, then those data described above are registered into the WWW data base 3 via the Internet. Further, if an image display button is clicked, then an image of the file entered in the image data section is displayed, for example, as seen in FIG. 3. Consequently, contents of the image data to be registered can be confirmed.

When the current position of a portable terminal 1 is in the proximity of the latitude of 40_/ 13' 10" and the longitude of 135_/ 40' 05", since such registration data as seen in FIG. 2 coincide with the current position in retrieval of the position by the portable terminal 1, the WWW data base 3 outputs the image data (data of Poster1) of the registration data to the portable terminal 1 via a host machine (access provider) 4.

The WWW data base 3 holds the URL of the WWW server 11 in a corresponding relationship to the image data and the position data supplied thereto from the information provider 2.

The host machine 4 is connected to the portable terminal 1 by a telephone line (by radio), and accesses the WWW data base 3 or the WWW server 11 via the Internet in accordance with a signal supplied thereto from the portable terminal 1 and transfers data supplied thereto from the WWW data base 3 or the WWW server 11 to the portable terminal 1.

The portable terminal 1 fetches an image and detects a current position thereof. Then, the portable terminal 1 retrieves position data around the current position from within the WWW data base 3 via the host machine 4 and reads out image data corresponding to the position data from the WWW data base 3 via the host machine 4.

Further, the portable terminal 1 selects that of the image data supplied thereto from the WWW data base 3 which conforms to the fetched image (that image data which is discriminated to be an image of a picture or characters same as a picture (pattern) or characters exhibited in the fetched image) and reads out a URL corresponding to the image data from the WWW data base 3 via the host machine 4.

Figure 4:
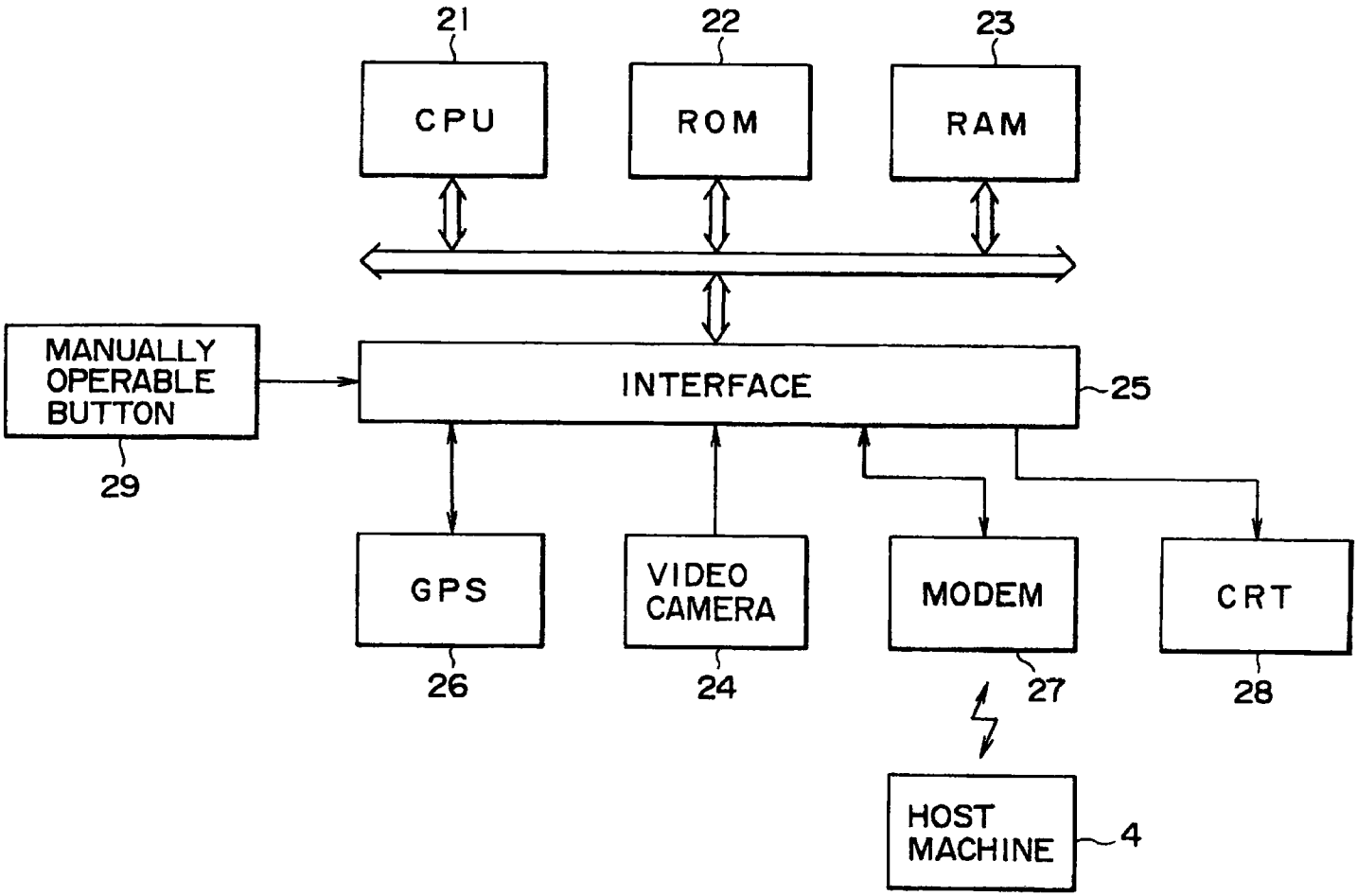
FIG. 4 is a block diagram showing an example of a detailed construction of the portable terminal shown in FIG. 1.

FIG. 4 shows an example of a detailed construction of the portable terminal 1. Referring to FIG. 4, the portable terminal 1 shown includes a CPU (selection means) 21 which performs various processes in accordance with a program stored in a ROM 22. A RAM 23 temporarily stores data when the CPU 21 performs processing.

A video camera 24 serving as fetching means fetches an image around the same and outputs the fetched digital image data to the CPU 21 via an interface 25.

A GPS (Global Positioning System) 26 serving as position detection means detects a current position such as a latitude and a longitude at which the portable terminal 1 is positioned at present, and outputs the position data to the CPU 21 via the interface 25.

A modem 27 serving as reception means outputs, under the control of the CPU 21, a predetermined signal to the host machine 4 via the telephone line (by radio). Further, the modem 27 supplies a signal from the host machine 4 transmitted thereto via the telephone line (by radio) to the CPU 21 via the interface 25.

A CRT 28 displays an image of an acquired URL or home page under the control of the CPU 21.

A manually operable button 29 is manually operated to fetch an image by means of a video camera 24 or to select a URL from among a plurality of URLs displayed on the CRT 28, and outputs a signal corresponding to the operation to the CPU 21 via the interface 25.

Figure 5:
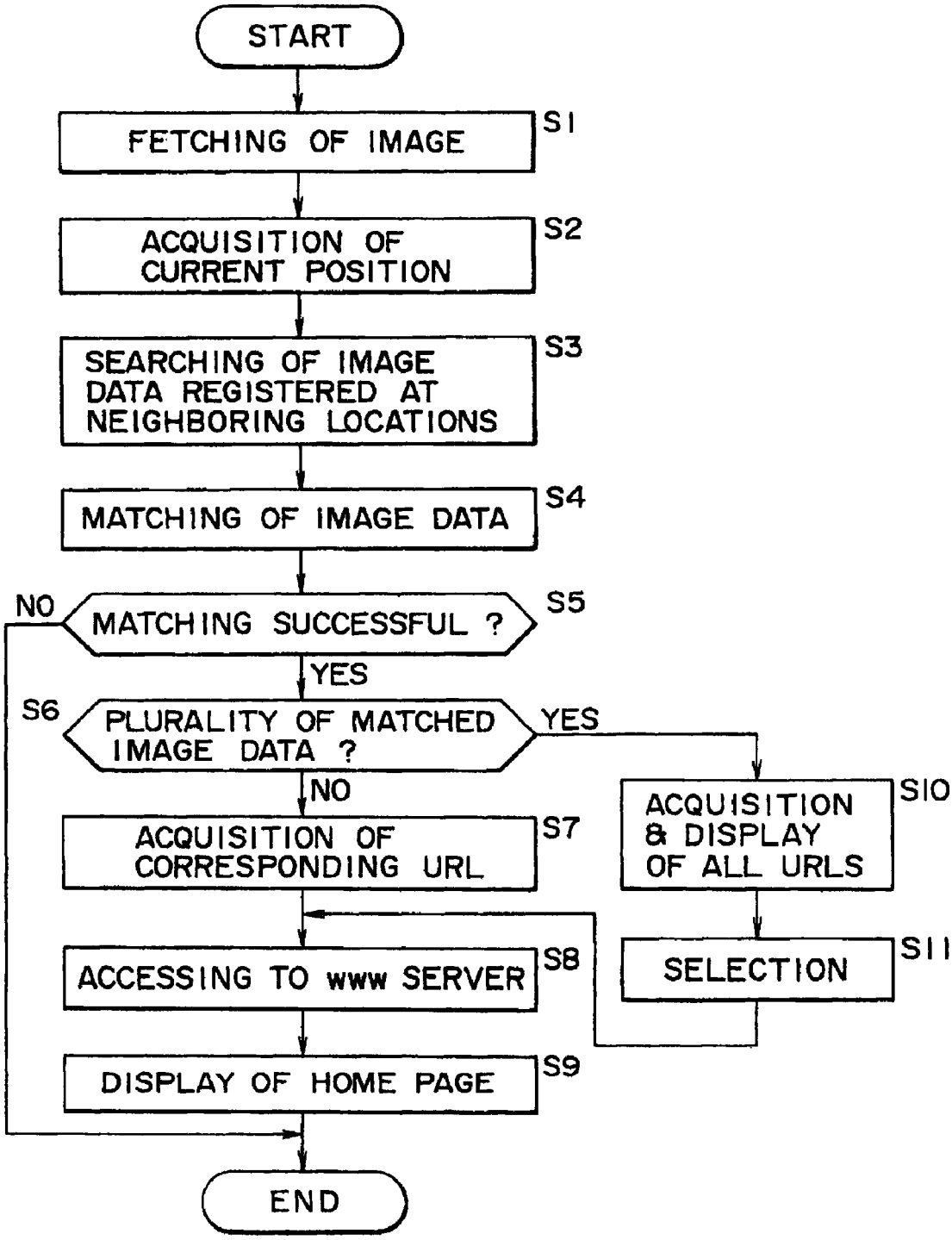
FIG. 5 is a flow chart illustrating operation of the portable terminal of FIG. 4.

Subsequently, operation of the portable terminal 1 will be described with reference to a flow chart of FIG. 5.

First in step S1, when a user manually operates the manually operable button 29, a signal representative of the operation is supplied to the CPU 21, and the video camera 24 fetches, under the control of the CPU 21, an image around the same in a direction in which the portable terminal 1 is directed. The video camera 24 supplies the thus fetched image data to the CPU 21 via the interface 25. The CPU 21 stores the image data into the RAM 23.

Figure 6:
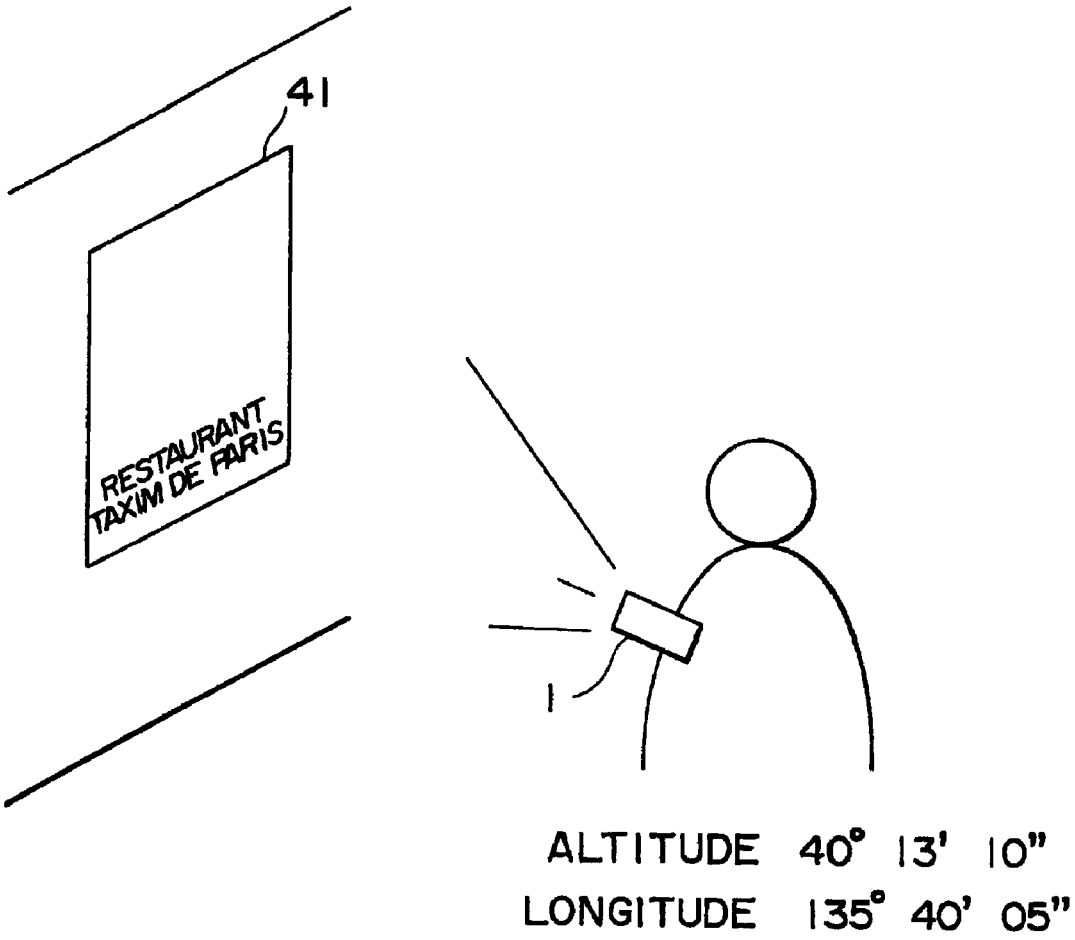
FIG. 6 is an illustration showing a manner in which an image is fetched using the portable terminal of FIG. 4.

It is assumed that the user is walking in a town carrying the portable terminal 1. Further, it is assumed that, in the town, for example, such a poster 41 as shown in FIG. 6 is put up on a board. When the user is interested in the poster 41 and tries to acquire detailed information relating to this, the user fetches an image of the poster 41 using the video camera 24. In the example shown in FIG. 6, an image of the poster of "Restaurant Taxim de Paris" is fetched.

Then in step S2, the CPU 21 instructs the GPS 26 to detect the current position of the portable terminal 1. The GPS 26 supplies the detected position data to the CPU 21 via the interface 25. The CPU 21 stores the position data into the RAM 23.

Since the user has fetched the image at the position of, for example, the latitude of 40__/ 13' 09" and the longitude of 135__/ 40' 06" as seen in FIG. 6, the GPS 26 detects this position (latitude of 40__/ 13' 09" and longitude of 135__/ 40' 06") and outputs the position data to the CPU 21.

In step S3, the CPU 21 requests the WWW data base 3 through the modem 27 to perform retrieval of position data based on the position data supplied from the GPS 26.

The WWW data base 3 retrieves those of the position data of the registration data which are data around the position supplied from the portable terminal 1 (that is, those position data which have coordinate values (in latitude and longitude) within a predetermined distance from the current position detected by the portable terminal 1). The WWW data base 3 then reads out image data of the registration data corresponding to the thus retrieved position data and outputs them to the portable terminal 1.

For example, when an image is fetched in such a situation as seen in FIG. 6, since the position detected by the portable terminal 1 is 40__/ 13' 09" in latitude and 135__/ 40' 06" in longitude, the WWW data base 3 searches for those of the registered data whose position data is around 40__/ 13' 09" in latitude and 135__/ 40' 06" in longitude.

Then, for example, if the restaurant named Taxim de Paris which acts as the information provider 2 has put the poster 41 on a board as an advertisement and has a home page of WWW produced in a predetermined WWW server 11 and besides has an image and the location of the poster 41 registered in the WWW data base 3 as seen in FIG. 2, since the location of the poster (40__/ 13' 10" in latitude and 135__/ 40' 05" in longitude) is in the proximity of the current position (40__/ 13' 09" in latitude and 135__/ 40' 06" in longitude) at which the user has fetched the image, image data (FIG. 3) of the registration of the poster 41 is retrieved from the WWW data base 3 and supplied to the portable terminal 1 via the host machine 4.

In step S4, the CPU 21 of the portable terminal 1 checks whether or not the image data read out from the WWW data base 3 matches with (corresponds to) the image fetched from the video camera 24. Then, in step S5, the CPU 21 checks the number of matching images, and if no matching image is detected, then the processing is ended. However, when an image or images match, the CPU 21 discriminates, in step S6, whether or not the number of matching images is 1. If the number of matching images is 1, then the control sequence advances to step S7.

For example, when an image is read in in such a situation as seen in FIG. 6 and such image data as seen in FIG. 3 are supplied to the portable terminal 1, since the poster shown in FIG. 6 is drawn in a similar design to the image data of FIG. 3, the CPU 21 of the portable terminal 1 discriminates that the image data (FIG. 3) matches with the fetched image (FIG. 6).

In step S7, the CPU 21 requests, via the modem 27, the WWW data base 3 to transfer of a URL corresponding to the conforming image. When the URL corresponding to the conforming image is acquired from the WWW data base 3, the portable terminal 1 accesses, in step S8, a WWW server 11 which has the URL.

In response to the accessing, the WWW server 11 outputs image data of the home page to the portable terminal 1. The portable terminal 1 receives, in step S9, the image data by means of the modem 27 and sends the image data to the CRT 28 so that they may be displayed on the CRT 28.

For example, when such registration data of "Restaurant Taxim de Paris" as seen in FIG. 2 are searched out in the retrieval, a URL of "http://www.taxim.co.jp" is read out from the WWW data base 3 and supplied to the portable terminal 1 via the host machine 4.

Figure 7:
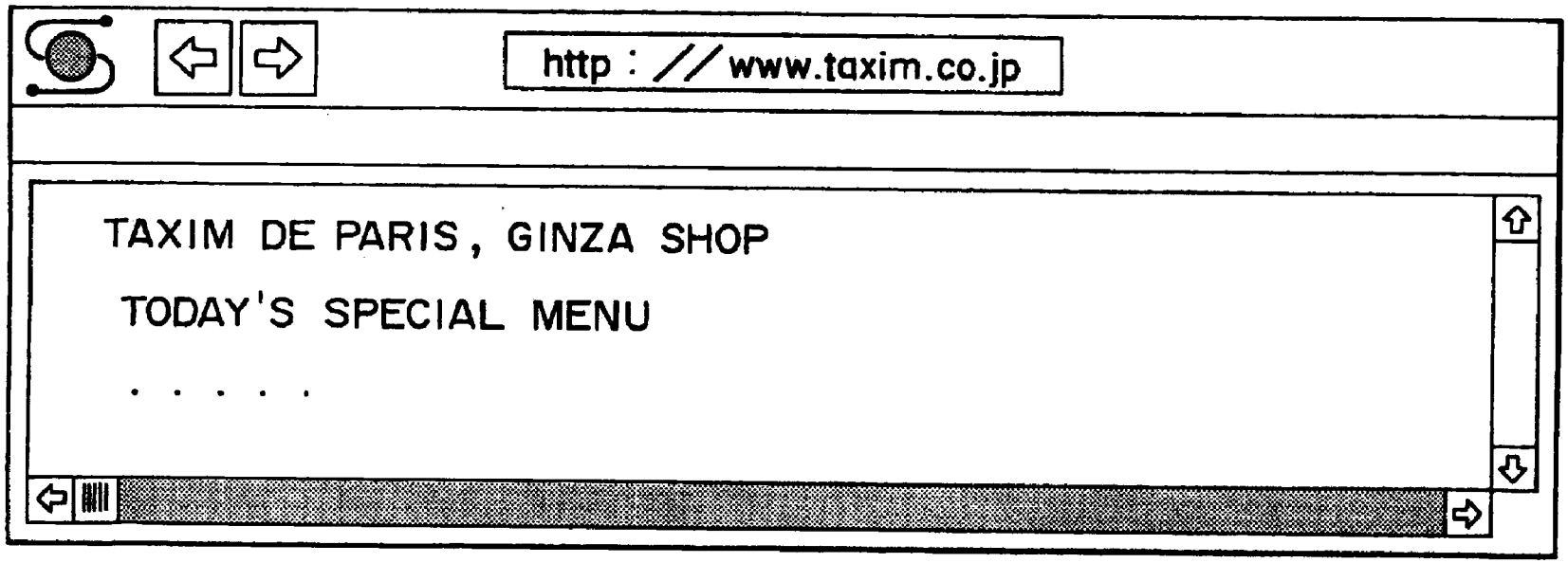
FIG. 7 is a schematic view showing an example of a display of a home page provided by a WWW server.
Figure 8:
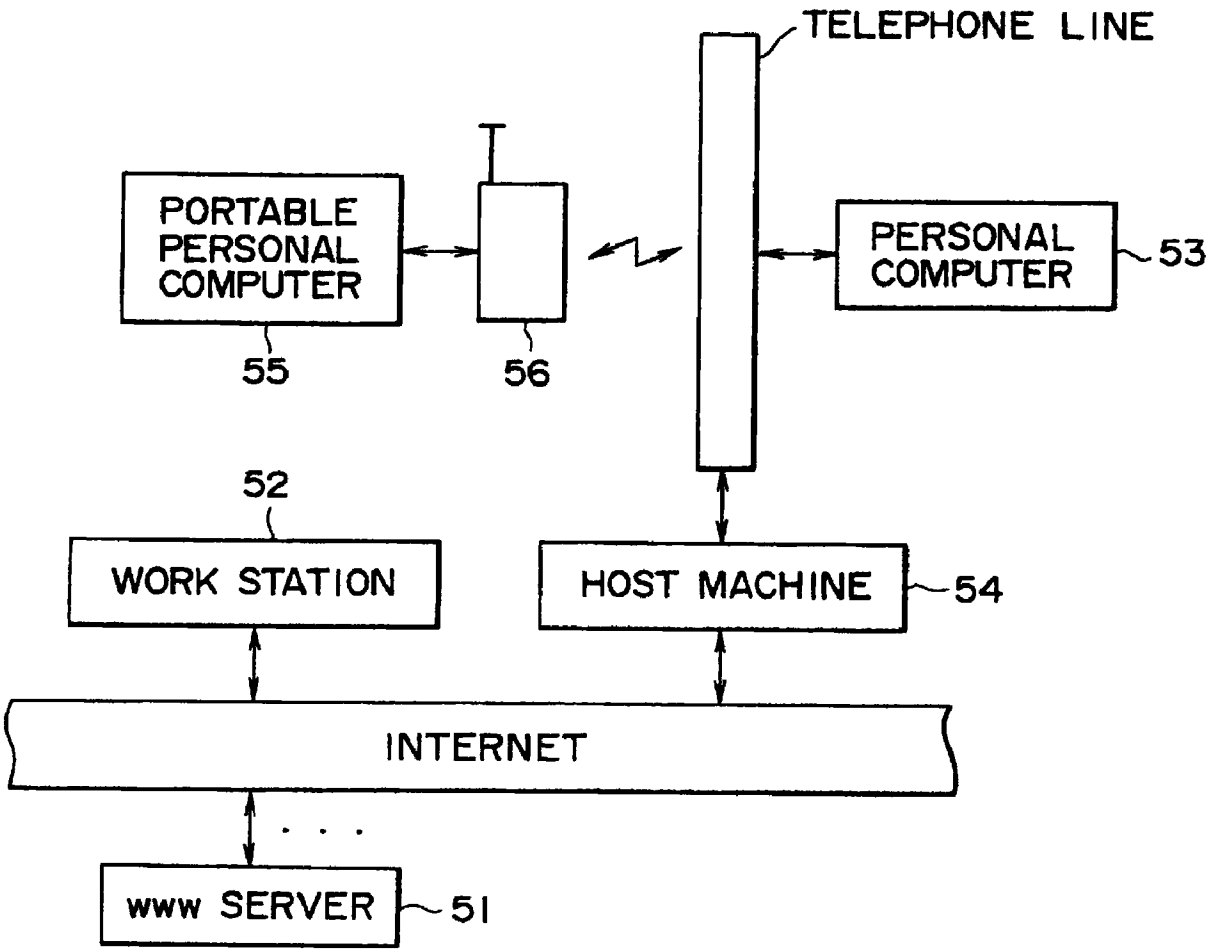
FIG. 8 is a block diagram showing terminal equipments connected to the Internet.

Then, the portable terminal 1 accesses the WWW server 11 designated by http://www.taxim.co.jp and receives such image data of the home page of "Restaurant Taxim de Paris" as seen in FIG. 7 from the WWW server 11. The image data are displayed on the CRT 28 of the portable terminal 1.

On the other hand, when it is discriminated in step S6 that the number of matching images is two or more, the control sequence advances to step S10, in which the portable terminal 1 requests the WWW data base 3 to transfer URLs corresponding to all of the conforming images.

The host machine 4 thus acquires URLs corresponding to all of the conforming images from the WWW data base 3 and outputs the URLs to the portable terminal 1. The portable terminal 1 receives the URLs and controls the CRT 28 to display them.

Then, in step S11, the user will manually operate the manually operable button 29 to select one of the URLs displayed on the CRT 28. The CPU 21 outputs the selected URL to the Internet via the modem 27. Consequently, accessing to the WWW server 11 designated by the URL is performed in step S8.

The host machine 4 outputs, when the home page is received from the WWW server 11 accessed by it, the image data of the home page to the portable terminal 1. Then, in step S9, the portable terminal 1 controls the CRT 28 to display the image of the home page received.

In this manner, the portable terminal 1 acquires a URL of a predetermined WWW server from the WWW data base 3 making use of a fetched image and data of the current position, and accesses the WWW server.

It is to be noted that, while, in the embodiment described above, an information retrieval apparatus of the present invention is applied to the portable terminal 1, it may otherwise be applied to a vehicle-carried terminal. In this instance, a URL is registered together with image data of road-signs, signboards and billboards along a road and detailed information is stored in a predetermined WWW server in advance. Then, when a user fetches an image of one of the road-signs, signboards and billboards, detailed information of it is read out from the predetermined WWW server.

Further, while, in the embodiment described above, the portable terminal 1 accesses the WWW data base 3 to perform retrieval when an image is fetched, image data and position data may be stored once into the RAM 23 so that, later at a different location (for example, after the user comes home), retrieval may be performed making use of the image data and the position data.

Furthermore, while, in the embodiment described above, the GPS 26 is utilized for detection of a position, the PHS (Personal Handy phone System) may be utilized alternatively. Since the PHS employs comparatively weak radio waves, a radio wave of a PHS terminal arrives only at a neighboring relay station or stations. Accordingly, in other words, when a relay station receives a radio wave, a PHS terminal is used around the relay station. Consequently, the position (region) in which a PHS terminal is used can be specified to a narrower range.

Further, where a PHS circuit is provided in the modem 27, communication with the host machine 4 and position detection can be performed by the PHS circuit. Consequently, the GPS 26 is unnecessary. Accordingly, the number of parts of the portable terminal 1 can be reduced, and the portable terminal 1 can be formed as an apparatus of a reduced size.

In addition, while, in the embodiment described above, a WWW of the Internet is utilized, it is otherwise possible to built up a similar system in a computer network other than the Internet to perform retrieval of information.

Having now fully described the invention, it will be apparent to one of ordinary skill in the art that many changes and modifications can be made thereto without departing from the spirit and scope of the invention as set forth herein.

What is claimed is:

[1. An information retrieval apparatus for retrieving information from a data base which contains registration data including position data, image data and designation information for retrieval of additional information comprising:

imaging means for obtaining an image;

location detection means for detecting a current position location of said information retrieval apparatus; and selection means for selecting image data from said data base which corresponds to the image obtained by said imaging means, said image data having position data representing positions in the vicinity of the current position location detected by said location detection means, and said designation information corresponding to said image data for retrieving said additional information.]

[2. An information retrieval apparatus according to claim 1, further comprising reception means for receiving the image data and the designation information via a computer network.]

[3. An information retrieval apparatus according to claim 2, wherein said reception means has a portable telephone function and is connected to said computer network via a telephone line.]

[4. An information retrieval apparatus according to claim 2, wherein the designation information is a URL for specifying information stored in a server of a world wide web build up on the Internet.]

[5. An information retrieval method for retrieving information by information retrieval apparatus from a data base which contains registration data including position data, image data and designation information for retrieval of additional information, comprising the steps of:

obtaining an image;

detecting the current position location of the information retrieval apparatus; and selecting image data from said data base which corresponds to the image obtained, said image data having position data representing positions in the vicinity of the detected current position location of the information retrieval apparatus, and designation information corresponding to said image data for retrieving said additional information.]

*6. An information terminal comprising:*

*an image capturing unit configured to capture an image and store the captured image as a captured image data item,*

*a transmitting unit configured to transmit information relating to a position of the information terminal to a remote server;*

*a receiving unit configured to receive, from the remote server, one or more image data items and information associated with each of the one or more received image data items, the received one or more image data items selected by the remote server from among a plurality of image data items for potentially corresponding to the captured image;*

*a providing unit configured to provide the retrieved information to a user; and*

*a user selection unit configured to allow the user to select at least one of the received image data items based, at least in part, on a comparison of the image data items with the captured image.*

*7. The information terminal according to claim 6, wherein the user selection unit facilitates comparison of characteristic portions of received image data items and a characteristic portion of the captured image data item.*

*8. The information terminal according to claim 6, wherein the transmitting and receiving units communicate with the remote server through a computer network.*

*9. The information terminal according to claim 6, wherein the information associated with each of the one or more received image data items is a URL identifying information stored in a world wide web server on the Internet.*

*10. The information terminal according to claim 6, wherein the information terminal is a mobile terminal.*

*11. An information retrieval system comprising:*

*a remote server;*

*a database in communicative contact with the remote server and storing a plurality of image data items, each of the plurality of image data items associated with specified information that is arbitrarily specified by an information provider; and*

*an information terminal includes comprising:*

*an image capturing unit configured to capture an image as a captured image data item;*

*a transmitting unit configured to transmit information relating to a position of the information terminal to the remote server;*

*a receiving unit configured to receive, from the remote server, one or more image data items and information*

*associated with each of the one or more received image data items, the received one or more image data items selected by the remote server from among a plurality of image data items for potentially corresponding to the captured image;*

*a providing unit configured to provide the retrieved information; and*

*a user selection unit configured to allow an user to select at least one of the received image data items based, at least in part, on a comparison of the image data items with the captured image.*

*12. An information retrieval method comprising:*

*capturing and storing an image as a captured image data item using an information terminal,*

*transmitting, via the information terminal, information relating to a position of information terminal to a remote server;*

*receiving, from the remote server, one or more image data items and information associated with each of the one or more received image data items, the received one or more image data items selected by the remote server from among a plurality of image data items for potentially corresponding to the captured image; and*

*presenting, to an user, at least one of the received image data items for selecting one of the received image data items based, at least in part, on a comparison of the received image data items with the captured image.*

* * * * *